July 11, 1944. W. D. HALL 2,353,155
MEASURING DEVICE
Filed May 7, 1938 3 Sheets-Sheet 1

Inventor:-
William D Hall

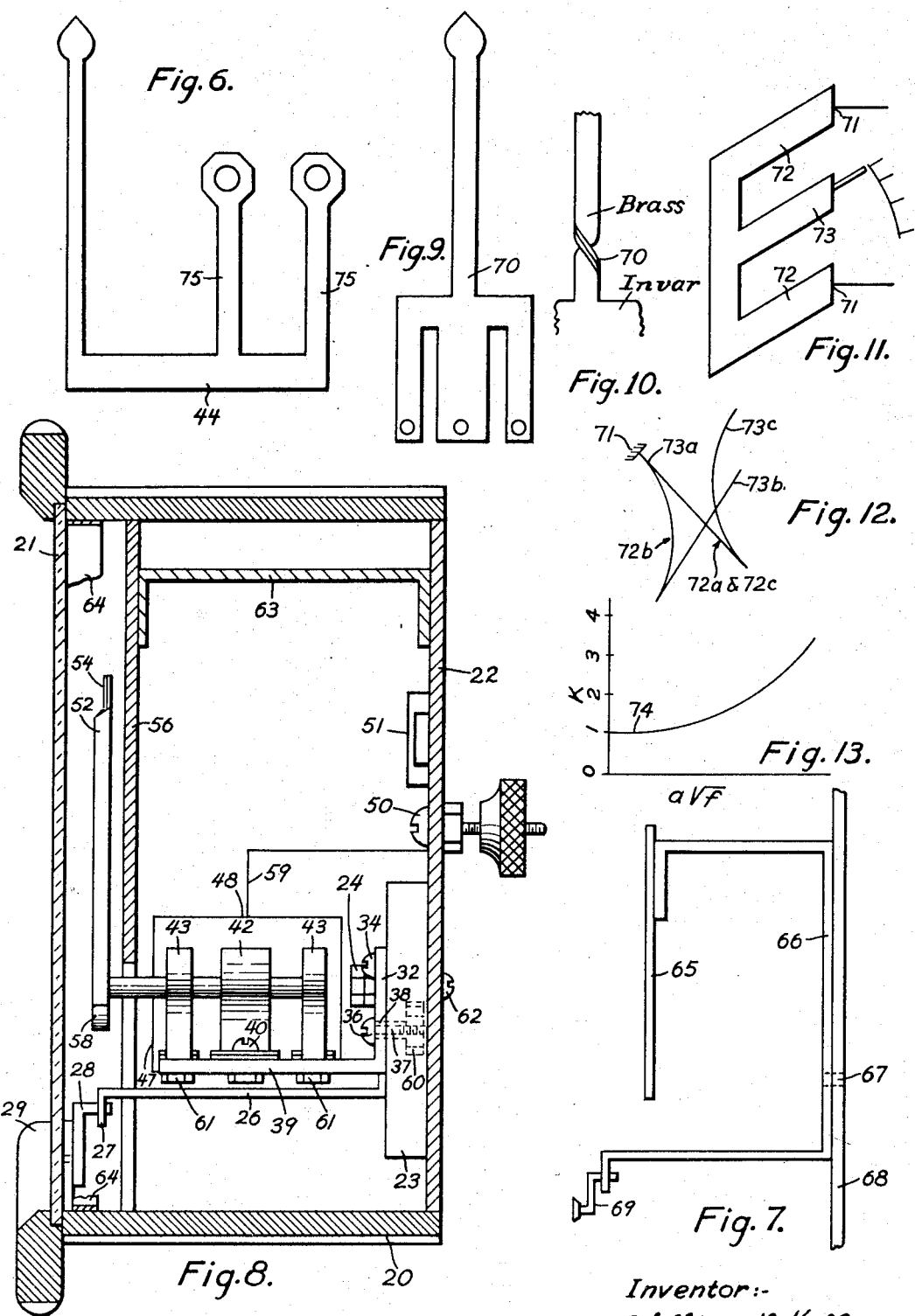

July 11, 1944.   W. D. HALL   2,353,155
MEASURING DEVICE
Filed May 7, 1938   3 Sheets-Sheet 3

Inventor:-
William D. Hall.

Patented July 11, 1944

2,353,155

UNITED STATES PATENT OFFICE 2,353,155

MEASURING DEVICE

William D. Hall, Elkins, W. Va.

Application May 7, 1938, Serial No. 206,625

11 Claims. (Cl. 171—95)

This invention relates to current-responsive devices and more particularly to high frequency ammeters. I refer to "high frequency" ammeters as instruments adapted to indicate radio frequency currents, however, they may be used for other purposes.

One object of my invention is to provide a low cost, yet satisfactory high frequency ammeter. Further objects reside in the provision of means for reducing frequency errors, means for causing the pointer to come to rest within a short interval after current is applied to the instrument, means whereby the instrument may be initially calibrated with facility or recalibrated in service if the initial accuracy is lost, and a zero adjuster which is rugged and inexpensive yet operable to effect slight changes in the zero position of the pointer. A still further object of my invention is to provide a configuration for the moving element which allows very thin strips of bimetal to be used and which has a pointer-section that reduces the errors caused by ambient temperature changes.

In carrying out the foregoing objects I provide a bimetallic sheet of U-shape the free end of one leg of the U being fastened to the base of the instrument, the end of the other leg being free and arranged to act as the sole pointer for the instrument by moving in front of a graduated scale. The supported leg of the U is heated by the current to be measured either by a heating wire adjacent thereto (for small currents) or by passing currents directly through the strips (for large currents).

At high frequencies, thermal instruments usually indicate an excessive value due primarily to skin effect. There are other causes for the error but during this discussion they are all considered as part of the skin effect error. Since my compensation scheme is applicable to ammeters other than those of the thermal type and is effective to reduce errors resulting from a variety of causes I am claiming the invention broadly in order to include the various modifications which may be made of my idea. Prior inventors have reduced such errors by precision work whereas I have found that it is possible to construct the instruments inexpensively and apply means for reducing the error.

To reduce the frequency error over the band of frequencies usually employed by radio amateurs (and others) I place a fixed condenser in parallel with the ammeter. I have found that a certain amount of resistance in series with such a condenser effects compensation over a wider band of frequencies than is obtained with a condenser alone. To reduce the amount of condenser compensation, I provide an arrangement of electrical conductors which react on the thermal element electromagnetically reducing the skin effect therein. I provide a scale with extra sets of graduations calibrated for ultra-high frequencies enabling accurate readings to be taken there. With one of my 0–8 ampere instruments, I found the maximum error (read on the scale calibrated with direct current) over the range of frequencies from 3,000 to 30,000 kilocycles was less than one-third the uncompensated error.

To effect "zero adjustments" I rotate the mounting support for the moving system. This method of zero adjustment is not only extremely simple and reliable but permits a very accurate adjustment. The center of said rotation is concentric with the graduation curve of the scale.

This application is a continuation-in-part of my prior copending application filed August 15, 1934, Serial No. 739,886, now United States Patent No. 2,211,773 of August 20, 1940, entitled Thermal ammeters, and also such a continuation-in-part of my application of October 26, 1935, Serial No. 46,955, bearing the same title as the parent application. Figures 1 to 13 hereof were part of the latter application. I have United States Patent No. 2,225,941 of December 24, 1940, which was granted on my copending application Serial No. 58,122 filed January 8, 1936, entitled Condition responsive device, and which discloses further work which I have done in the field of bimetallic current-responsive devices.

In the drawings:

Figure 6 shows a simplified arrangement of the bimetallic stamping.

Figure 7 illustrates a modified method of adjusting the zero position of the pointer.

Figure 8 is a sectional view taken along line 8—8 of Figure 1.

Figure 9 shows a modified form of the bimetallic stamping.

Figure 10 shows a part of the stamping of Figure 9 after the first step in the formation process. The pointer arm is twisted 180 degrees, hence the reader sees the brass side of the pointer and the Invar side of the current-heated section.

Figure 11 illustrates another form of bimetallic ammeter.

Figure 12 demonstrates the operation of Figure 11.

Figure 13 is a curve showing the relation between the skin effect ratio of a material having a size $a$ and the frequency $f$.

Figure 14:
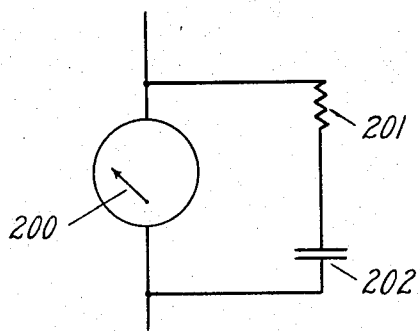

Figure 14 shows a schematic diagram of my scheme for reducing skin effect errors.

Figure 15:
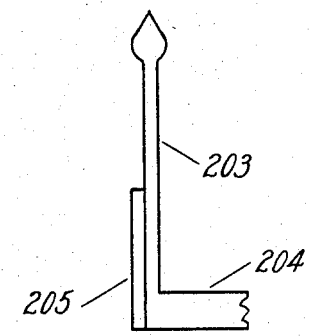

Figure 15 illustrates a modified shape of bimetallic stamping.

Figure 16:
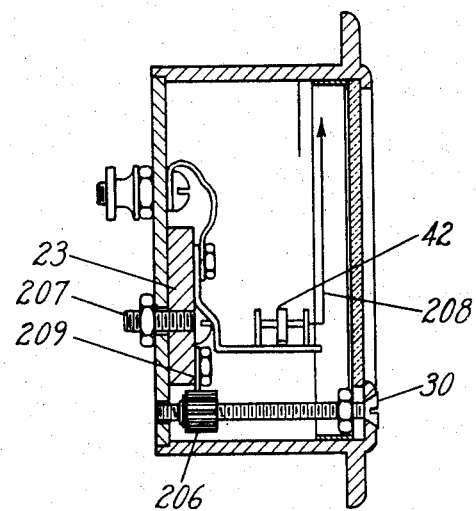

Figure 16 is a sectional view of a modified form of my invention.

Figure 1:
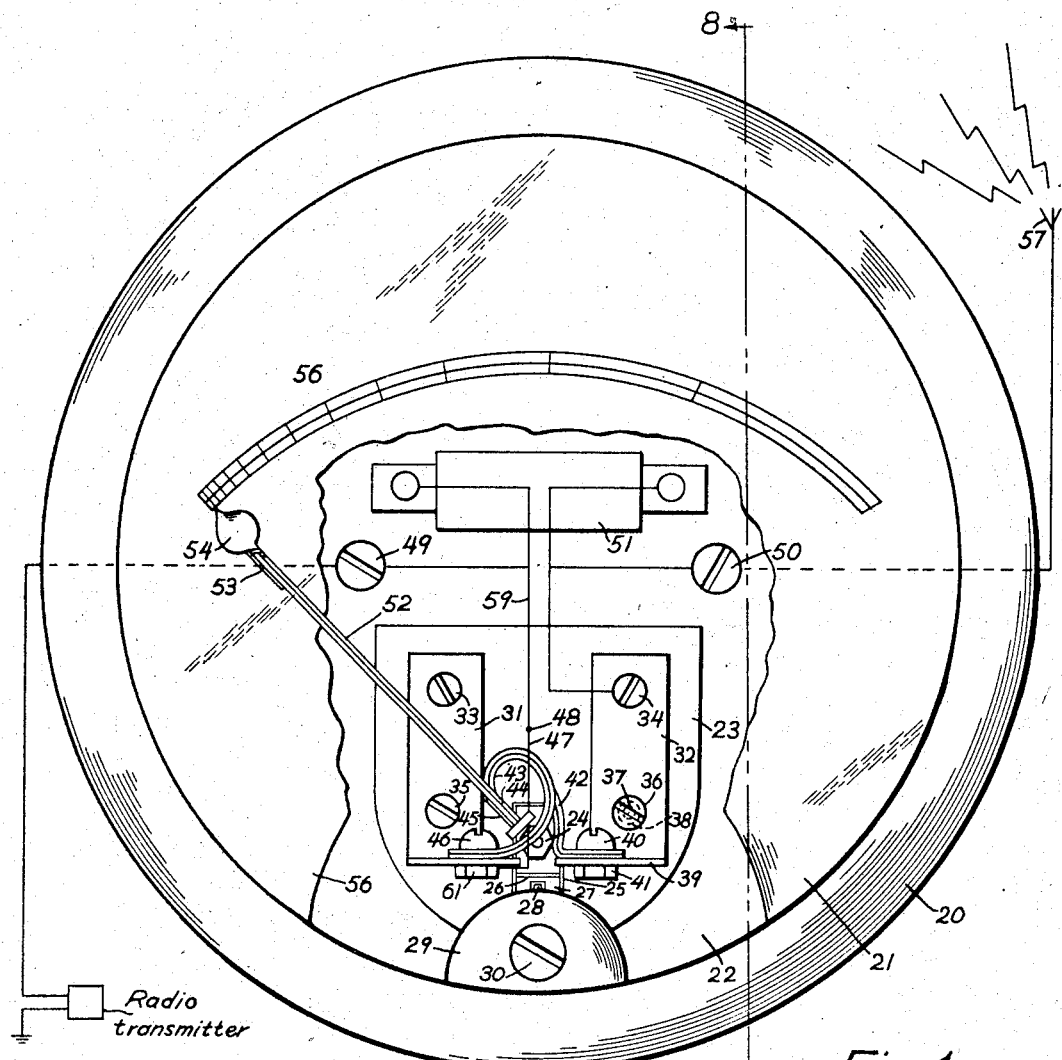
Figure 1 is a front view of one form of my bimetallic ammeter.

The instrument shown in Figure 1 is inclosed in a casing 20 which has a Bakelite base 22 and a glass front 21. The glass front is held in place by the metallic band 64 which is partly shown. Casing 20 has a portion 29 which carries the zero-adjusting screw 30 which screw extends through the casing and is connected to the L-shaped arm 28. The arm 28 engages the sides 27 of the slotted horizontal member 26 which member is fastened to the structure 23, the latter having slot 25 to receive member 26. The bolt 62 constitutes the sole support for rotatable structure 23 and acts as a pivot therefor. Said bolt extends through the base 22, the structure 23, and has two nuts 24. It is evident that when the screw 30 is rotated the member 28 engages 27 rotating the structure 23 which carries and thereby rotates the entire movement including the pointer. A modified form of my zero adjuster consists in using gearing instead of the single-toothed arrangement shown (see Figure 16).

With the device of Figure 1, the zero adjusting screw 30 operates a pinion 28 which in turn engages a gear 29. In Figure 16 the zero adjusting screw 30 operates a pinion 206 which in turn engages a gear 209. To insure that pinion 206 will be firmly secured to the threads of screw 30, the threads on both sides of the pinion are spread or "jammed." Gear 209 is pivoted at 207 and this pivot constitutes the sole support for the sub-base 23 as well as the entire ammeter movement 42 which movement is mounted on the sub-base 23 in the manner hereafter fully described. The pivot 62 for sub-base 23 is located at the center of rotation of the movement 42 and accordingly the pivot is concentric with the curvature of the scale graduations 56. Likewise the pivot 207 in Figure 16 is at the center of rotation of the moving element 42 and is concentric with the scale graduations. The above-described zero adjuster is of advantage not only from the standpoints of rigidity, smoother and more precise adjustment than prior devices, lower in cost, but provides insulation between the screw-head 30 and circuit 59 by the large sub-base 23, which is of insulating material, rather than by insulation in the screw 30 itself as is common in prior devices. If protection against very high voltages is desired, the screw 30 as well as the sub-base 23 may be made of steatite in which event the operator will be subject to a minimum danger. So far as the external operation of the zero-adjuster is concerned it is similar to the prior art method in which the screw 30 is rotated in a direction opposite which it is desired for the pointer to rotate and such rotation of screw 30 is made until the pointer 52 is brought to rest in line with "0" graduation on the scale plate 56.

Still another form of zero-adjuster is illustrated in Figure 7 where a screw 69 engages the support 66 which support carries scale 65. Said support 66 is pivoted about base 68 by a bolt 67. As in the case of Figure 1, here again the insulation is provided at the base of the ammeter.

Figure 16 illustrates the parts in the lower section of the casing as being slightly wider in separation than in my actual device to thereby demonstrate the cooperation of the parts without possible confusion which might be created if the parts were shown crowded together.

Figures 2, 3, 4:
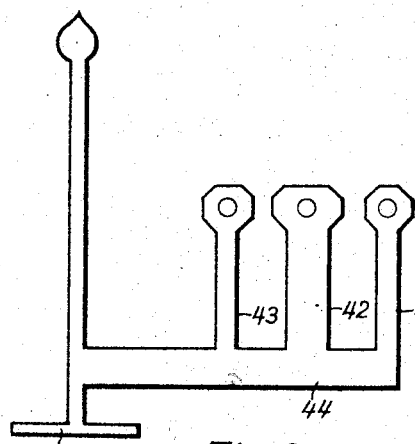
Figure 2 shows a plan view of a bimetallic stamping which may be formed to the proper shape to constitute the movement of the ammeter of Figure 1.
Figure 3 illustrates a side view of Figure 2 before the element is formed to said proper shape.
Figure 4 is a side view of Figure 2 after the first few steps of the formation process.

Reverting to Figure 2, a bimetallic stamping is illustrated having three current carrying arms designated by reference numbers 42 and 43. Arm 42 has a width equal to the sum of the widths of outer arms 43, each of these arms having a hole for a mounting screw at one end whereas the other ends of these arms are integral with the cross-arm 44. Figure 3 is an end view of Figure 2 but greatly widened for the bimetallic strip is only 0.001" to 0.002" thick and cannot be conveniently illustrated in proper proportions. Figure 4 is similar to Figure 3 except the first few steps toward forming the stamping of Figures 2 and 3 have been completed, namely the end of arm 42 has been bent at a 90 degree angle to the stamping and the tip 54 of the pointer section 52 has been twisted. The stamping has also been electroplated along the sections labeled "P" to prevent those sections from deflecting under influence of temperature changes. This electroplating process is completed by merely submersing those sections into an electroplating solution and passing a current through the stamping until a thin coating is effected, preferably solely on the low expansive side of the bimetal. So far as the invention claimed is concerned, the low expansive side of the bimetal may be painted or otherwise coated to avoid deflection of these sections under influence of temperature changes. The arms 42 and 43 are then coiled and the counterweight 58 folded into a knot in order to complete the formation process of the bimetal.

The central arm 42 is then bolted to support 39 whereas both arms 43 are bolted to the L-shaped arm 31. Bolts 40, 46 which respectively have nuts 41, 61 secure arms 42 and 43 respectively to their L-shaped supports 32 and 31. Current from the radio transmitter flows into terminal 49, joint 48, conductors 47, strips 43, cross-arm 44 to the central arm 42, thence to support 32 and finally to terminal 50 which feeds the radio antenna 57. The directions of the currents with relation to the bimetallic stamping and its adjacent conductors are illustrated by arrows in Figure 5. Supports 32 and 31 are attached to sub-base 23 by four bolts 33, 34, 35, and 36. The threaded portion of bolt 36 is designated by reference number 37 which portion 37 passes through a somewhat larger hole 38 so that it is possible by loosening bolt 36 to rotate support 32 about pivot 34 either toward or away from support 31. After rotation has been effected, screw 36 may be tightened to its nut 60 to prevent further rotation. The advantage of this construction resides in the ability to change the calibration of the instrument by rotating this support. For example, should it be found that either during manufacture or in service the deflection of the pointer does not align with the proper graduation point on the scale plate 56 (which may be printed) the bolt 36 should be loosened and support 32 rotated toward or away from support 31 until the calibration is correct. The rotation of support 32 in the manner just described compresses middle arm 42 to the left thereby increasing the tension in the bimetal and requiring a greater force to produce a given deflection. The degree to which support 32 must be capable of rotating depends upon the accuracy of construction of bimetal 42, 43 etc. and unless fair accuracy is maintained greater rotation must be effected than is illustrated.

Figure 5:
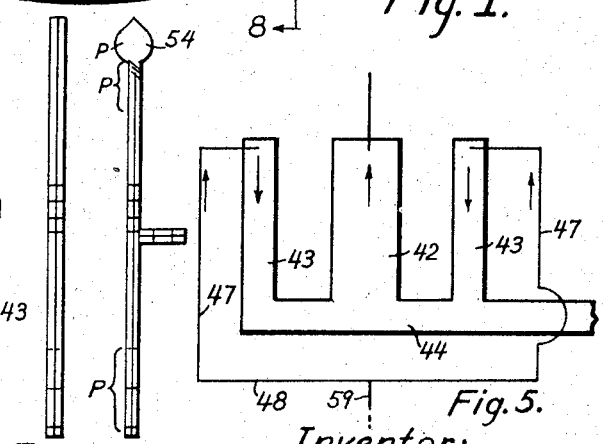
Figure 5 shows the relative arrangement of the bimetallic stamping and the wires connecting the stamping to the terminals.

It is understood that as current flows through the bimetal in the manner shown in Figure 5, the arms 42 and 43 uncoil rotating the pointer clockwise. It is also understood that coils 42 and 43 may be coiled clockwise instead of counterclockwise in which event they would coil up as they were heated. The pointer 52 in the case shown tends to rotate counterclockwise when it alone is heated and therefore it is possible to provide such a length for pointer 52 that in response to ambient temperature changes its counterclockwise rotation neutralizes the clockwise rotation of strips 42, 43 to effect compensation over a wide range of temperatures. The tip 54 of pointer 52 creates a "spade" enabling the indications to be visible some distance from the instrument.

Figure 6 illustrates an ammeter having arms 75 which are provided to carry the current. They may be mounted respectively on supports 31 and 32 and adjusted similarly to the stamping of Figure 2.

Figure 9 illustrates still another form of ammeter wherein the pointer is twisted at 70 in order that the pointer section compensates for ambient temperature changes.

Reverting again to Figures 2 and 8 it is noted that as current passes through the bimetal, the bimetal is heated to a degree depending upon the current-squared multiplied by the resistance of the bimetal. The resistance of the bimetal changes with frequency due to skin effect. One phase of the skin effect problem is that of "proximity effect" the latter being applicable to electrical circuits where parallel wires carry currents in opposite directions.

The usual rules governing the spacing of high frequency conductors in measuring instruments are stated in Bureau of Standards Circular 74 in the following manner (see p. 302):

"In a return circuit of tubular conductors the distance between the conductors should be kept as great as 10 or 20 cm. For tubular conductors nearly in contact the resistance ratio may be double that for a spacing of a few centimeters."

The above effect is not only applicable to tubular conductors but also to strip conductors when the edges of the strips face each other as shown by Figure 2. The arm 42 provides a return conductor for strip 43 which is relatively close to strip 42. In an instrument of this kind it would be impracticable to provide spacings of 10 to 20 centimeters, and therefore to avoid that necessity, three strips are used. The return field of strips 43 cancel each other as respecting strip 42. The field produced by the front arm 43 tends to force current in arm 42 toward one edge whereas the field produced by the rear arm 43 tends to force the current toward the opposite edge of arm 42. Hence, the proximity effect in arm 42 is relatively small and half of the torque-producing area of the bimetal is immune from this error. Arms 43, however, are not in a position to effectively neutralize the proximity error of each other and accordingly conductors 47 are provided. The fields produced by conductors 47 react with the field of arm 42 and reduce the proximity effect error in strip 43.

While the arrangement of conductors 42, 43, and 47 just described is valuable in reducing frequency errors, I find it desirable to effect still further compensation by means of condenser 51. It is understood of course that condenser 51 can be omitted if the instrument is considered sufficiently accurate without it. The condenser 51 is preferably of such size that the reading at the high frequency at which the ammeter is most used is the same as the reading of the ammeter on direct current. To find this correct size of condenser I find it desirable during the design of the ammeter to try first large capacity condensers subsequently trying smaller and smaller sizes until finally the size is found where complete compensation is attained. With such a condenser, most of the current from the radio transmitter flows in the relatively non-inductive circuit 59, 32 but some current is diverted through condenser 51. In Figure 14 I have illustrated an ammeter 200, shunted by condenser 202 and resistor 201. If resistor 201 has a few ohms, I find that more perfect compensation (over a wider range of radio frequencies) may be effected. Resistance in the thermal (or other type) ammeter 200 has almost the same effect, but less power is lost if the resistor 201 is positioned as shown in Figure 14. Resistor 201 has the further advantage that should a frequency be obtained where the condenser 202 resonates with the very small inductance which is to be maintained in instrument 200 (and the leads to condenser 202) the circulating current will be limited by resistor 201 thereby preventing a large ammeter indication.

An example of the effectiveness of my device will now be illustrated. The best commercial thermocouple instruments of a full scale range of five amperes are rated as having a skin effect error of 9% at 14,000 kilocycles and 22½% at 28,000 kilocycles. Another and cheaper make of thermocouple ammeter has an error of over 40% at 14,000 kilocycles. Even this latter make of instrument is far more expensive than my instrument. Without employing the condenser 202 I can attain results comparing favorably with said best commercial instruments at said amateur radio frequencies, provided I employ a bimetal of high resistivity. In my 0–8 ampere ammeter, a low resistance bimetal is desirable so that the strips 42, 43 will not be unduly wide and will fit into a standard casing. With such low resistance bimetal, the error at 28,000 kilocycles (without condenser 202) is over 100%. If I utilize a condenser 202 of 0.10 mfd. and a resistor 201 of a few ohms, the frequency error of my device at 14,000 kilocycles (as compared to direct current) is not perceptible, and it is less than 20% at 28,000 kilocycles.

Referring now to Figure 15, I describe a possible improvement in the pointer arrangement of Figure 1 which overcomes the following difficulty. Heat sometimes passes from strips 42, 43 along 44 to the base of pointer 52. Such heat is undesirable inasmuch as it is delayed (in accordance with the laws of heat conduction) and its major effect occurs after 42, 43 have reached their substantial maximum position. Hence, without my improvement, frequently the pointer after attaining an up-scale position drifts backwards even though the current remains constant. With my improvement Figure 15, the delayed heat never reaches the active portion of the pointer strip 52 and the disadvantage is overcome. In Fig. 15, a cross-arm 204 corresponds to arm 44 of Fig. 2, and is integral with pointer 203 and strip 205. Elements 203 and 205 constitute a channel (or fold as described in my copending application #58,122) and are relatively insensitive to heat. The active portion of the pointer 203 is then too far from strips 42, 43 for them to appreciably heat such active portion.

The device of Figure 1 is temperature compensated quite well at all scale points due to the fact that pointer strip 52 is longer than strips 42, 43 and also the pointer strip 52 has the same angle with respect to support 61 at both zero and full scale positions. With one particular instrument I found that the temperature compensation was so good that either at the zero position or at a wide range of currents near half scale there was no perceptible error either at room temperature or at ambient temperatures much higher than the human body could endure. This is believed to be a great advance in the art of bimetallic strip type instruments as heretofore only compensation of a kind was possible. To illustrate the general errors which I have overcome I have shown in Figure 11 an ammeter with all three strips parallel to the zero graduation. Diagrams of the various stages of the operations of Figure 11 are shown in Figure 12. Suppose at a room temperature of 0° C. current is passed through strips 72 until they deform 90 degrees thereby rotating strips 73 to 73b. Further assume a temperature rise of T° C. was effected by the current in order to thus deform strip 72 to 72b. Let us now assume that the room temperature falls below 0° C., in fact to make the problem easy assume it falls to −T° C. Under these conditions strip 72 returns to a substantially straight position and strip 73 bends to 73c. It can readily be seen that the positions 73b and 73c which correspond respectively to the indications at 0° C. and −T° C. are radically different. It is true that both have the same inclination but the position on the scale graduation curve has changed. One way to reduce this error is to make pointer bimetallic strip 52 longer than strips 42, 43 but to get complete compensation it is desirable to support the fixed ends of 42, 43 on an axis perpendicular to the center of the graduation curve. By this, I do not mean that support 39 must be horizontal or vertical or that strip 42 emerges vertically or horizontally, but rather I mean that the beginning of the active portion of the bimetal is on an axis, which axis is perpendicular to the center of the graduation curve. For example, if a line were drawn parallel to line 8—8 of Fig. 1 passing through the central point of the scale, it would pass through the substantial supported position of 42, 43.

In flowing through the high frequency ammeter 200 the current takes two distinct paths, the actual instrument 200 and the condenser path 202. These paths have different phase angles of impedance so that compensation is effected.

Whereas others have used precision work in developing ammeters with small heating wires, special shunts equivalent to current transformers, etc. which enable correct indications to be given I have shown a new principle namely one where the ammeters are constructed inexpensively with a relationship of phase angles which compensates for frequency errors. By such compensation, I refer to reduction of errors which occur from changing frequency and not necessarily to reduction of such errors between direct currents and high frequency currents.

I claim to have invented:

1. A bimetallic ammeter suitable for radio frequency use comprising a thin bimetallic strip of a thickness no greater than two thousandths of an inch and relatively short, a support for one end of said strip and in electrical connection to said end, a return electrical conductor attached to the other end of said strip and returning relatively close and parallel to said strip to minimize inductance, and a radio frequency conductor adapted to force radio currents through said support, strip, and return conductor.

2. A measuring device having, means suitable for measuring radio frequency currents of frequencies as high as fourteen million cycles per second, said means comprising a current carrying heating element having a ratio of $$\frac{\text{surface area in square inches}}{\text{volume in cubic inches}}$$

which exceeds five hundred, and which element has the characteristic due to the skin effect phenomenon that radio frequency currents will tend to flow through certain symmetrically located paths with greater density than they tend to flow through certain other paths of the cross-section of said element, a terminal with electrical conducting means carrying radio frequency currents from said terminal to said element, said conducting means being positioned to carry current in a direction opposite to the flow in said element and closer to said symmetrically located paths of greater density than to said paths of said cross-section of lesser density, and a second terminal with an electrical conducting means for carrying the current from said element to said second terminal, said electrical conducting means both being so related to each other and including such means as to enable satisfactory operation of the ammeter at radio frequencies.

3. An ammeter suitable for and adapted to measure radio frequency currents comprising a heating element with indicating means responsive to the temperature thereof, and radio frequency conducting means for forcing current through said heating element, said conducting means including a portion which is not heated to the extent necessary to affect said indicating means and has sections symmetrically located with respect to said element, close thereto, and arranged to carry currents in a direction opposite to the flow of current in said element.

4. An electrical instrument comprising heat-responsive indicating means, a circuit including a heating portion thermally related with said heat responsive indicating means through which current may be passed to heat said indicating means, and means constituting a part of said circuit for setting up a field which reacts electromagnetically on the current flowing in said heating portion to force high frequency current away from the surface of said heating portion where such current would otherwise tend to concentrate and thus more evenly distribute high frequency current throughout the cross-section of said heating portion than would normally exist without such electromagnetic reaction and thereby reduce the skin effect error when high frequency alternating current is passed therethrough.

5. A measuring instrument comprising in combination, heat sensitive measuring means of E-shape, the cross-member of said E being electrically conducting and the arms of said E being bimetallic strips similarly disposed so that their respective torques add to each other as their temperatures increase, the middle arm being of double the width of the outer arms, a supporting current connection to which both outer arms are connected at their unjoined ends, a supporting current connection to which the middle arm is connected at its unjoined end, means including an indicator element actuated by deflection of said cross-member, and a scale cooperating with said element.

6. A radio frequency ammeter having a casing and means inside said casing which will measure radio frequency currents of frequencies as high as fourteen million cycles per second; said means comprising a measuring element having a U-shaped portion the legs of which U are bimetallic strips of a thickness no greater than 0.002" and coiled into a coil of less than one full turn, the area of said coil being relatively small as compared to the external area of said casing whereby any capacitive currents to metallic objects external to said casing will be small, supporting current connections respectively at the open ends of said U, a shaft carried solely by said measuring and rotated thereby, terminals passing from the inside to the outside of said casing, radio frequency conducting wires leading from said terminals to said supporting current connections, said wires being arranged to readily admit flow of current of a frequency as high as fourteen million cycles per second from one of said terminals to and through said U and therefrom to the other terminal, a scale graduated in terms of current, and a pointer supported solely by said shaft for indicating the values of radio frequency current on said scale.

7. In a radio frequency ammeter, a casing, radio frequency current conducting means adapted to be connected in series with a radio transmitting antenna circuit, said radio frequency conducting means including as a part thereof a bimetallic strip through which current flows when said radio frequency conducting means is connected in series with an antenna circuit, the entire portion of said bimetallic strip through which such current flows being of a thickness no greater than 0.0025 inch and concentrated in coiled form solely near one end of said casing, means supporting said strip, and indicating means for indicating the deflection of said strip, whereby values of radio frequency current are measured.

8. A low inductance high frequency current-responsive device comprising electrical heating means having spaced parallel portions which electrically carry the current to be measured, and current carrying means in series with said heating means and including portions symmetrically positioned with respect to and adjacent said electrical heating means and carrying current in the opposite direction from that of said electrical heating means, and means responsive to the current-produced heating of said electrical heating means.

9. In an electrical instrument, the combination with a U-shaped current-carrying element having bimetallic strips as the legs of the U which are adapted to deflect under the heating influence of a current flow therethrough, of supporting current connections at the outer ends of the legs of said U, one of said supporting current connections including shiftable means associated therewith to enable shifting of one of said current connections with respect to the other in a plane that is perpendicular to the face of said bimetallic strips.

10. A radio frequency ammeter comprising means adapted to indicate radio frequency currents of frequencies as high as fourteen million cycles per second; said means including all the following parts, a bimetallic strip of a thickness no greater than 0.0025 inch, an electrical current path connected to the strip for passing the radio frequency current to be measured directly through the strip whereby to heat and deflect the strip, indicating means actuated by flexure of said strip, and a scale cooperating with said indicating means.

11. In a radio frequency ammeter, in combination, a first resistor through which current to be measured may be passed, indicating means responsive to heat developed due to current flow through said resistor, first and second terminals respectively connected to opposite sides of said resistor, a second resistor having first and second sides the first side of which is connected to the first side of the first resistor, a condenser one side of which is connected to the second side of the first resistor and the other side of which is connected to the second side of said second resistor; and a scale cooperating with said indicating means; said condenser and said second resistor having such relative values of impedance that at high frequency a substantial current is shunted around the first resistor in such quantity as to substantially reduce frequency errors, and being further so related that the second resistor has sufficiently high resistance value as to effect evenness of the degree of compensation over a considerably wider band of frequencies than would exist without said second resistor.

WILLIAM D. HALL.

CERTIFICATE OF CORRECTION.

Patent No. 2,353,155.   July 11, 1944.

WILLIAM D. HALL.

It is hereby certified that error appears in the printed specification of the above numbered patent requiring correction as follows: Page 5, first column, line 29-30, claim 6, after the word "measuring" insert --element--; and that the said Letters Patent should be read with this correction therein that the same may conform to the record of the case in the Patent Office.

Signed and sealed this 26th day of September, A. D. 1944.

Leslie Frazer (Seal)

Acting Commissioner of Patents.